United States Patent [19]
Stephens

[11] Patent Number: 5,495,404
[45] Date of Patent: Feb. 27, 1996

[54] MULTI-RESONANT INVERTER

[75] Inventor: Dennis L. Stephens, Niles, Ill.

[73] Assignee: Motorola, Inc., Schaumburg, Ill.

[21] Appl. No.: 282,336

[22] Filed: Jul. 29, 1994

[51] Int. Cl.$^6$ .................................................. H02M 7/5387
[52] U.S. Cl. .................................................. 363/132; 363/136
[58] Field of Search .................................. 363/17, 22, 23, 363/24, 25, 26, 132, 133, 134, 136, 139

[56] References Cited

U.S. PATENT DOCUMENTS

| | | | |
|---|---|---|---|
| 4,692,667 | 9/1987 | Nilssen | 363/17 |
| 4,954,754 | 9/1990 | Nilssen | 315/219 |
| 5,060,130 | 10/1991 | Steigerwald | 363/132 |
| 5,065,301 | 11/1991 | Shioya et al. | 363/132 |
| 5,130,610 | 7/1992 | Kakitani | 315/219 |
| 5,191,263 | 3/1993 | Konopka | 315/209 |
| 5,208,738 | 5/1993 | Jain | 363/132 |
| 5,214,355 | 5/1993 | Nilssen | 315/219 |
| 5,438,497 | 8/1995 | Jain | 363/132 |

*Primary Examiner*—Jeffrey L. Sterrett
*Attorney, Agent, or Firm*—J. Ray Wood

[57] ABSTRACT

A multi-resonant circuit has a series-resonant circuit coupled to the input of an inverter. The output of the inverter is coupled to a parallel resonant circuit. The output of the parallel resonant circuit energizes a load, which could be gas discharge lamps. The operating frequency of the inverter is between the resonant frequency of the series resonant circuit and the resonant frequency of the parallel resonant circuit.

19 Claims, 1 Drawing Sheet

MULTI-RESONANT INVERTER

BACKGROUND OF THE INVENTION

Inverters are circuits for converting DC power to AC power. One type of inverter circuit uses a parallel resonant circuit as the output stage.

A parallel resonant circuit has an inductor in parallel with a capacitor. The inductance of the inductor and the capacitance of the capacitor determine the resonant frequency of the parallel resonant circuit.

The inverter operates at an inverter frequency. Usually, the inverter frequency is at slightly higher frequency than the resonant frequency of the parallel resonant circuit.

Parallel resonant inverter circuits produce at the output a constant voltage independent of load. Thus, with fluorescent lamps, it is possible to easily connect the lamps in parallel. This is advantageous because removal of one lamp will not result in the extinguishment of all other lamps.

Parallel resonant circuits may be relatively expensive. The parallel resonant inverter circuits must be "current fed", i.e., a source of constant DC current must be provided to the parallel resonant inverter circuit. Providing a source of constant DC current requires a very large inductor. A large inductor requires an inductor with a large number of turns, thus making the inductor costly.

Further, when the load coupled to the parallel resonant circuit, the power produced by the parallel resonant circuit is not decreased. For example, if a parallel resonant inverter energizes a number of lamps, if one lamp is removed, increased power is supplied to the remaining lamps, causing the lamps to noticeably brighten. In such a situation, the life of the lamp may be reduced by the changes in the power supplied to the lamps.

DETAILED DESCRIPTION OF THE PREFERRED EMBODIMENT

In order to increase the efficiency of an inverter using a parallel resonant output, a series resonant circuit is provided at the input of the inverter. The resonator frequency of the series resonant is about that of the resonant frequency of the parallel resonant circuit. The inverter is operated at a frequency between the resonant frequency of the series resonant circuit and the resonant frequency of the parallel resonant circuit.

Such a circuit provides higher efficiency than conventional parallel resonant inverter circuits. By using a resonant circuit, the inductance of the current feed inductor may be reduced, thus improving the cost of the circuit. Finally, when the switches in the inverter circuit are self-oscillating, the circuit compensates for reductions in load by changing the gain of the circuit, simplifying the design of the circuit.

Figure 1:
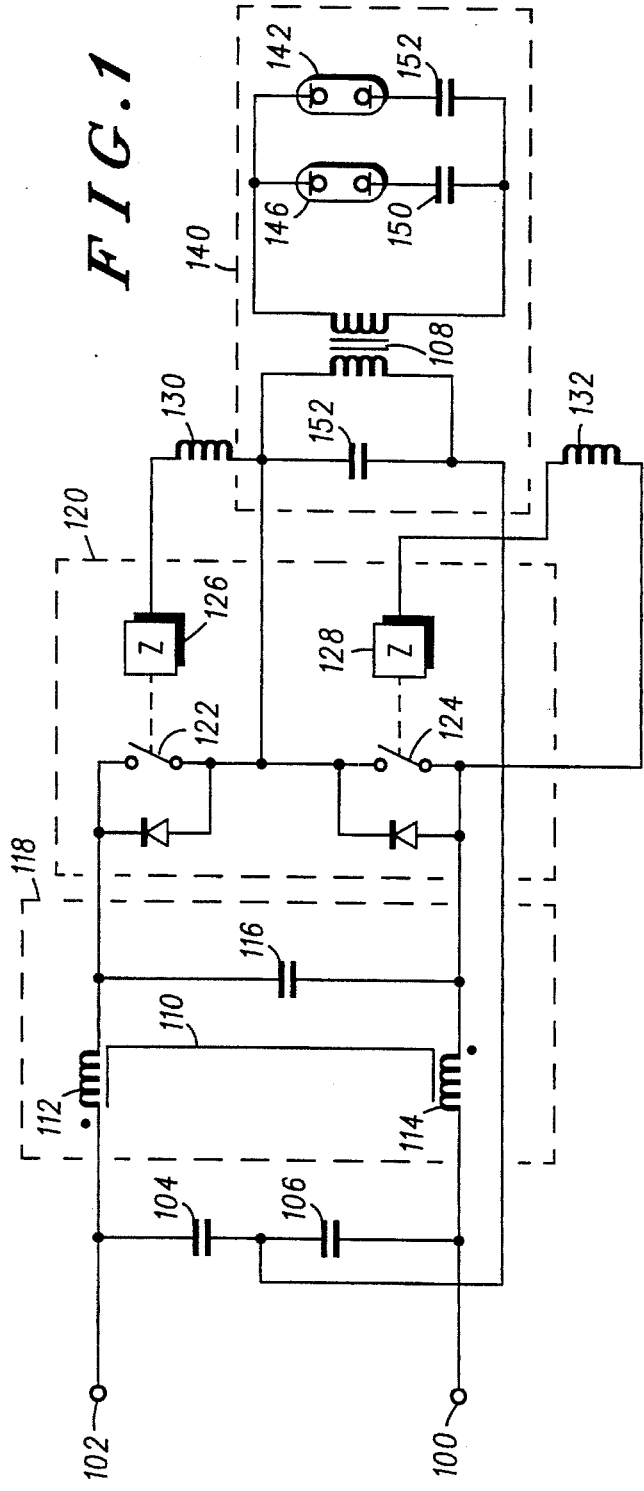
FIG. 1 is a multi-resonant inverter circuit.

FIG. 1 shows a multi-resonant AC inverter. (For proper operation, a starting circuit is required.)

Terminals 100, 102 are connected to a source of DC power. DC blocking capacitors 104, 106 are series connected and in parallel with the source of DC power. DC blocking capacitors 104, 106 prevents DC current from flowing through transformer 108.

Split inductor 110 is composed of first winding 112 and second winding 114. First winding 112 is connected between terminal 102 and series resonant capacitor 116. Second winding 114 is connected between terminal 100 and series resonant capacitor 116.

Split inductor 110 and series resonant capacitor forms series resonant circuit 118. Series resonant circuit 118 has a fundamental resonant frequency. The fundamental resonant frequency of series resonant circuit is $1/(LC)^{1/2}$.

Half-bridge inverter 120 is connected in parallel with capacitor 116, with one input terminal of half-bridge inverter 120 connected to first winding 112 and the other input terminal connected to second winding 114. The half-bridge inverter 120 is operated at an inverter frequency.

Inverter 120 has two switches 122, 124. Switches 122, 124 could be, among other things, bipolar junction transistors, field effect transistors or thyristors. Diodes 124, 126 are in parallel with switches 122, 124. (Some switches, such as field effect transistors, inherently have these diodes in parallel.)

Switches 122, 124 are driven from transformer 108 through impedance networks 126, 128 by drive windings 130, 132. Switches 122, 124 are driven as self-oscillators. The windings 130, 132 are phased to alternately turn on switches 122, 124 through impedance networks 126, 128. Impedance networks 126, 128 provide proper phase shift for the operation of switches 122, 124. Switches 122, 124 are driven such that the on-times of switches 122, 124 do not overlap. Thus, switch 122 is never on when switch 124 is on.

The output of inverter 120 is coupled to parallel resonant circuit 140. As shown, the parallel resonant circuit 140 includes parallel resonant capacitor 142 in parallel with parallel resonant coupled inductor 144. Parallel resonant coupled inductor 144 serves as a resonant inductor for parallel resonant circuit 140 and as an impedance matching device for lamps 146, 148.

Parallel resonant circuit 140 includes lamps 146, 148 and resonant current limiting capacitors 150, 152. Capacitors 150, 152 provide proper impedance to limit the current to the lamps 146, 148. (As is well known, fluorescent lamps are negative impedance devices.)

The fundamental resonant frequency of parallel resonant circuit 140 is $1/(LC)^{1/2}$ where L is the inductance of parallel resonant inductor 144 and C is the capacitance of capacitors 142, 150, 152.

Figure 2:
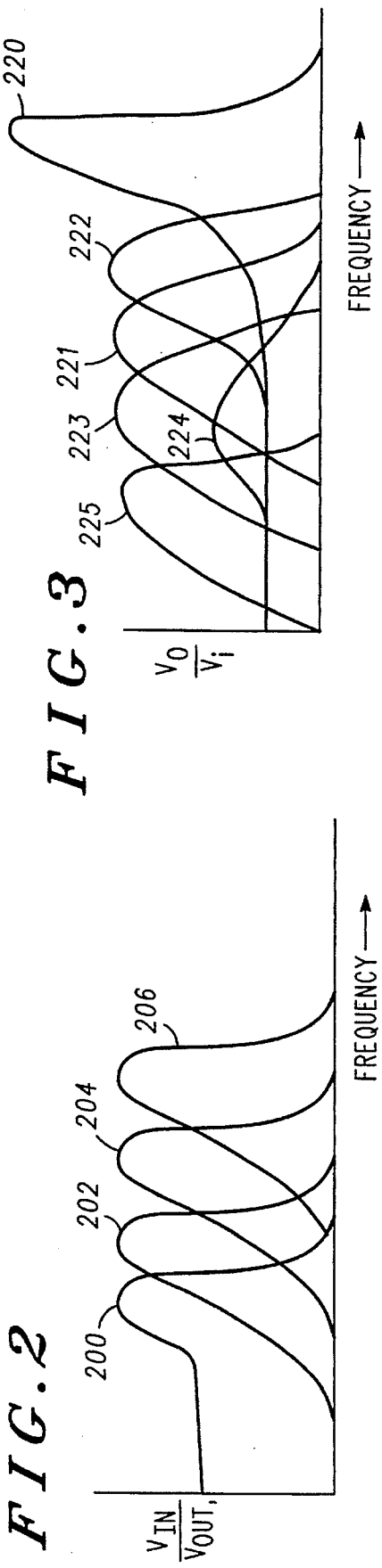

Operation of the circuit may be seen from FIG. 2. FIG. 2 shows the gain of the resonant circuits of FIG. 1. Series resonant gain curve 200 is the gain of series resonant circuit 118. Fully loaded parallel resonant gain curve 202 is the gain of parallel resonant circuit 140 with full load. Partially loaded parallel resonant gain curve 204 is the gain of parallel resonant circuit 140 with a load less than a full load. Unloaded parallel resonant gain curve 206 is the gain of parallel resonant circuit 140 with no-load.

If either lamp 146, 148 is removed from the circuit, the corresponding resonant current limiting capacitors 150, 152 are removed as a resonating element of parallel resonant circuit 140. Thus, the resonant frequency of parallel resonant circuit 140 increases. Because switches 122, 124 are self-oscillating (i.e., driven by windings 130, 132), the switching frequency changes, thus changing the frequency of operation of inverter 120. The frequency of operation is at the intersection of series resonant gain curve 200 and partially loaded parallel resonant gain curve 204. Again, the gain of each curve is maximized.

Circuit components are chosen so that the inverter frequency during steady state operation is approximately equal to the frequency at the intersection of the series resonant gain curve 200 and the fully loaded parallel resonant gain curve 202. This provides optimum operation of the circuit and minimizes the losses of the circuit. The gain of the series resonant circuit 118 and the gain of parallel resonant circuit 140 are thus maximized.

Since the frequency of operation of the two is further apart, the gain is, in fact, reduced. This is desirable effect since the power out to a single lamp is not as high as to two lamps. Thus, if a lamp is removed from the circuit, the lamp does not significantly brighten. Thus, lamps may last for a longer period of time since the lamp is not subjected to varying power.

Finally, if both lamps 146, 148 are removed, both resonant current limiting capacitors are removed as resonating elements of resonant circuit 140. Thus, the resonant frequency of parallel resonant circuit 130 increases further. Again, the inverter operating frequency stays approximately equal to the intersection of curve 200 and curve 206. The gain is thus further reduced. This is also desirable since without any load the power supplied out of the parallel resonant circuit should be minimized.

In FIG. 2, the series resonant gain curve 200 is shown as static as the load is changed. However, the series resonant gain curve may vary slightly as the load is changed. In order to maintain the series resonant gain curve constant over changes in the load, the inductance of inductor 110 and the capacitance of capacitor 116 are selected to dominate the resonant characteristics of series resonant circuit 118 such that the resonant frequency of series resonant circuit 118 is insensitive to variations in the load.

Figure 3:
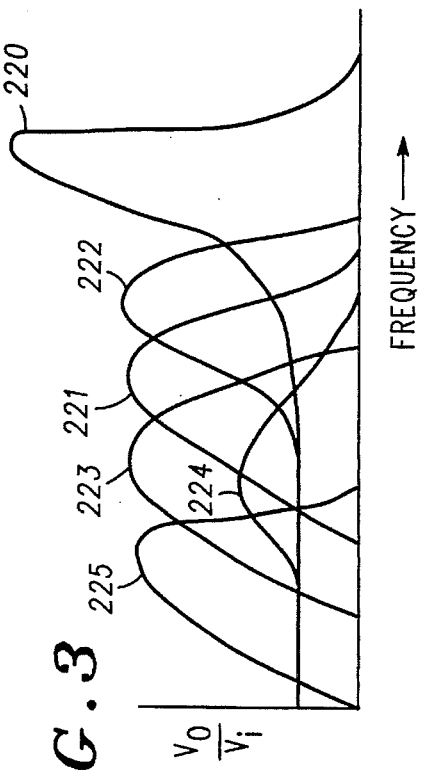
FIGS. 2 and 3 are graphics showing the resonant frequency of series resonant circuit, the parallel resonant frequency, and the operating frequency of the inverter.

For the circuit shown in FIG. 1, it may be advisable to have the resonant frequency of series resonant circuit 118 to be greater than the resonant frequency of parallel resonant circuit 140. For such a configuration, FIG. 3 shows the gain of the series resonant circuit and the gain of the parallel resonant circuit.

In such a circuit, the inductance of inductor 110 and the capacitance of capacitor 116 are selected so that loading of the circuit changes both the resonant frequency and the gain of the resonant circuit 118, and is well As the load is decreased, both the gain and the resonant frequency of series resonant circuit 118 increase.

Curve 220 shows the gain of series resonant circuit 118 with no load, while curve 221 shows the gain of parallel resonant circuit 140 with no load. Curve 222 shows the gain of series resonant circuit 118 with only one lamp in the circuit, while curve 223 shows the gain of parallel resonant circuit 140 with one lamp in the circuit. Finally, curve 224 shows the gain of series resonant circuit 118 fully loaded, while curve 225 shows the gain of parallel resonant circuit 140 with fully loaded.

The resonant frequencies of the series resonant circuit 118 and the parallel resonant circuit 140 are selected at the intersection of the curves. This provides maximum efficiency of both the series resonant circuit 118 and the parallel resonant circuit 140.

Thus, the multi-resonant circuit has excellent gain during a fully loaded condition, while the gain changes as the load on the circuit decreases.

We claim:
1. A multi-resonant circuit for energizing a load comprising:

a DC voltage source;

an inverter operating at an inverter frequency, the inverter having an inverter output;

a parallel resonant circuit coupled between the inverter output and the load, the parallel resonant circuit having a first fundamental resonant frequency;

an input inductor coupled between the DC voltage source and the inverter;

a capacitor coupled to the input inductor such that a series resonant circuit is formed, the series resonant circuit having a second fundamental resonant frequency; and the first fundamental resonant frequency and the second fundamental resonant frequency selected such that losses of the multi-resonant circuit are minimized and the inverter frequency is between the first fundamental resonant frequency and the Second fundamental resonant frequency.

2. The circuit of claim 1 where the inverter is a two-transistor inverter.

3. The circuit of claim 2 where the inverter is a half-bridge inverter.

4. The circuit of claim 2 where the inverter is a push-pull inverter.

5. The circuit of claim 1 where the first fundamental resonant frequency is within 10% of the second fundamental resonant frequency.

6. The circuit of claim 1 where the first fundamental resonant frequency and the second fundamental resonant frequency are about equal.

7. The circuit of claim 1 where the input inductor is a split inductor, and the split inductor has a first winding and a second winding.

8. The circuit of claim 7 where the inverter has a first inverter input terminal and a second inverter input terminal, and the first winding is coupled to the first inverter input terminal and the second winding is coupled to the second inverter input terminal.

9. The circuit of claim 8 where a pair of series connected DC blocking capacitors are connected in parallel with the DC voltage source.

10. The circuit of claim 9 where the DC blocking capacitors have approximately the same capacitance.

11. The circuit of claim 10 where the parallel resonant circuit has a first terminal and a second terminal, and the first terminal is connected to an output of the inverter and the second terminal is connected to a junction between the DC blocking capacitors.

12. A circuit comprising:

a DC voltage source;

a half-bridge inverter operating at an inverter frequency, the half-bridge inverter having two transistors, each transistor being periodically turned off and on such that, during steady state operation, both transistors are not on at the same time, and the half-bridge inverter having an inverter output;

a parallel resonant circuit coupled between the inverter output and a load, the parallel resonant circuit having a first fundamental resonant frequency;

an input inductor coupled between the DC voltage source and the half-bridge inverter;

a capacitor coupled to the input inductor such that a series resonant circuit is formed, the series resonant circuit having a second fundamental resonant frequency; and the first fundamental resonant frequency and the second fundamental resonant frequency selected such that losses of the circuit are minimized and the inverter frequency is between the first fundamental resonant frequency and the second fundamental resonant frequency.

13. The circuit of claim 12 where the first fundamental resonant frequency is within 10% of the second fundamental resonant frequency.

14. The circuit of claim 12 where the first fundamental resonant frequency and the second fundamental resonant frequency are about the same.

15. The circuit of claim 14 where the input inductor is a split inductor, and the split inductor has a first winding and a second winding.

16. The circuit of claim 15 where the half-bridge inverter has a first inverter input terminal and a second inverter input terminal, and the split inductor is positioned such that the first winding is coupled to the first inverter input terminal and the second winding is coupled to the second inverter input terminal.

17. The circuit of claim 16 where a pair of series connected DC blocking capacitors are connected in parallel with the DC voltage source.

18. The circuit of claim 17 where the DC blocking capacitors have approximately the same capacitance.

19. The circuit of claim 18 where parallel resonant circuit has a first terminal and a second terminal, and the first terminal is connected to the inverter output and the second terminal is connected to a junction between the DC blocking capacitors.

* * * * *